United States Patent [19]

Tadakuma et al.

[11] 4,142,235
[45] Feb. 27, 1979

[54] ELECTRONIC CASH REGISTER

[75] Inventors: Yuji Tadakuma; Syunji Saito; Toru Eguchi, all of Ohito, Japan

[73] Assignee: Tokyo Electric Co., Ltd., Tokyo, Japan

[21] Appl. No.: 799,987

[22] Filed: May 24, 1977

[30] Foreign Application Priority Data

May 24, 1976 [JP] Japan .................................. 51-59851
May 24, 1976 [JP] Japan .................................. 51-59853
May 24, 1976 [JP] Japan .................................. 51-59854

[51] Int. Cl.² ...................... G07G 5/00; G06C 29/00; G06F 3/12
[52] U.S. Cl. ........................... 364/405; 235/3; 235/10; 235/60 P
[58] Field of Search ............ 235/10, 22, 7, 8, 58 CW, 235/60 C, 60 P, 2, 3, 60, 25; 364/710, 405

[56] References Cited

U.S. PATENT DOCUMENTS 2,636,435  4/1953  Goodbar et al. .................. 235/3
2,675,959  4/1954  Dey ................................. 235/10

Primary Examiner—Stephen J. Tomsky
Attorney, Agent, or Firm—Flynn & Frishauf

[57] ABSTRACT

An electronic cash register comprises a keyboard having a plurality of numeral entry keys and function keys, a drawer to be opened after the depression of a specified function key, a printer for printing on a blank receipt the data defined by operation of the entry keys and function keys, and a receipt feed device for feeding a blank receipt and taking out a printed receipt. The electronic cash register is further provided with a detection device and a receipt cutting device. The detection device detects the drawer-shutting and thus actuates the receipt cutting device when the drawer is shut.

7 Claims, 8 Drawing Figures

ELECTRONIC CASH REGISTER

BACKGROUND OF THE INVENTION

This invention relates to an electronic cash register, the drawer of which is opened at each registration.

Generally, a cash registration is made in the following steps. First, the price of each item of goods the customer has just bought is registered. Then the total sales to the customer are calculated. Next, cash equal to or more than the total sales is received, and the amount of the cash is registered. The change, if any, is registered. Here ends the cash registration. Then, the drawer is opened, and a receipt is simultaneously issued, printed with the transaction data and cut off the roll of receipt paper.

Usually, the received cash is put into the drawer, and the change, if any, is taken out from the drawer. The change is given to the customer together with the receipt which has been just made out automatically by opening the drawer. But it often happens that the receipt falls onto the floor or is lost in the drawer while the cashier is putting the received cash into the drawer and counting the change.

SUMMARY OF THE INVENTION

An object of this invention is to provide an electronic cash register which issues a receipt each time the drawer is shut.

An electronic cash register according to the invention comprises a keyboard having a plurality of entry keys and at least one transaction key, data storing means, printing means, data processing means for supplying to said storing means the data defined by the key operation on said keyboard and for supplying an instruction signal to said printing means thereby to print said data on a recording paper, a drawer for storing cash, detection means for generating an output signal upon detecting the shutting of the drawer, and cutting means for cutting the recording paper in response to the output signal of said detection means.

DETAILED DESCRIPTION OF THE PREFERRED EMBODIMENT

Figure 1:
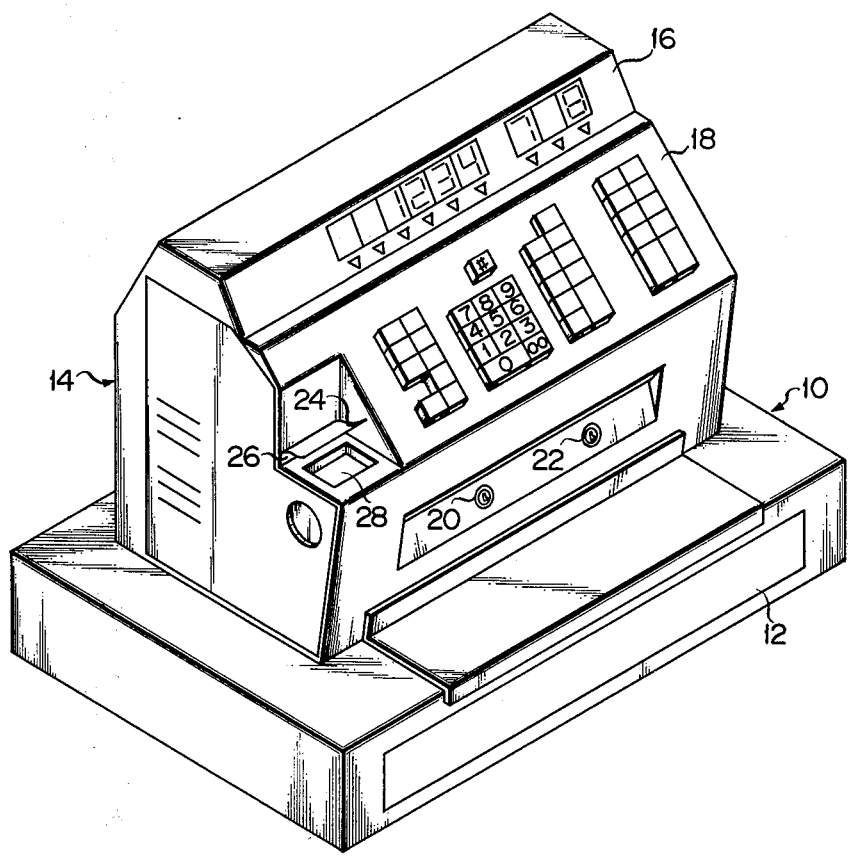
FIG. 1 is a perspective view of an electronic cash register according to this invention.

FIG. 1 shows an electronic cash register according to one embodiment of this invention. The cash register is provided with a box 10, a drawer 12 normally placed in the box 10, and a casing 14 mounted on the box 10. The casing 14 has a display device 16 at its top portion, a keyboard 18 below the display device 16, and a main switch 20 and a clerk switch 22 both arranged on its lower front face. Provided adjacent to the display device 16 are a receipt issue slot 26 through which a receipt 24 is issued and a window 28 through which the data printed on a journal paper is checked.

Figure 2:
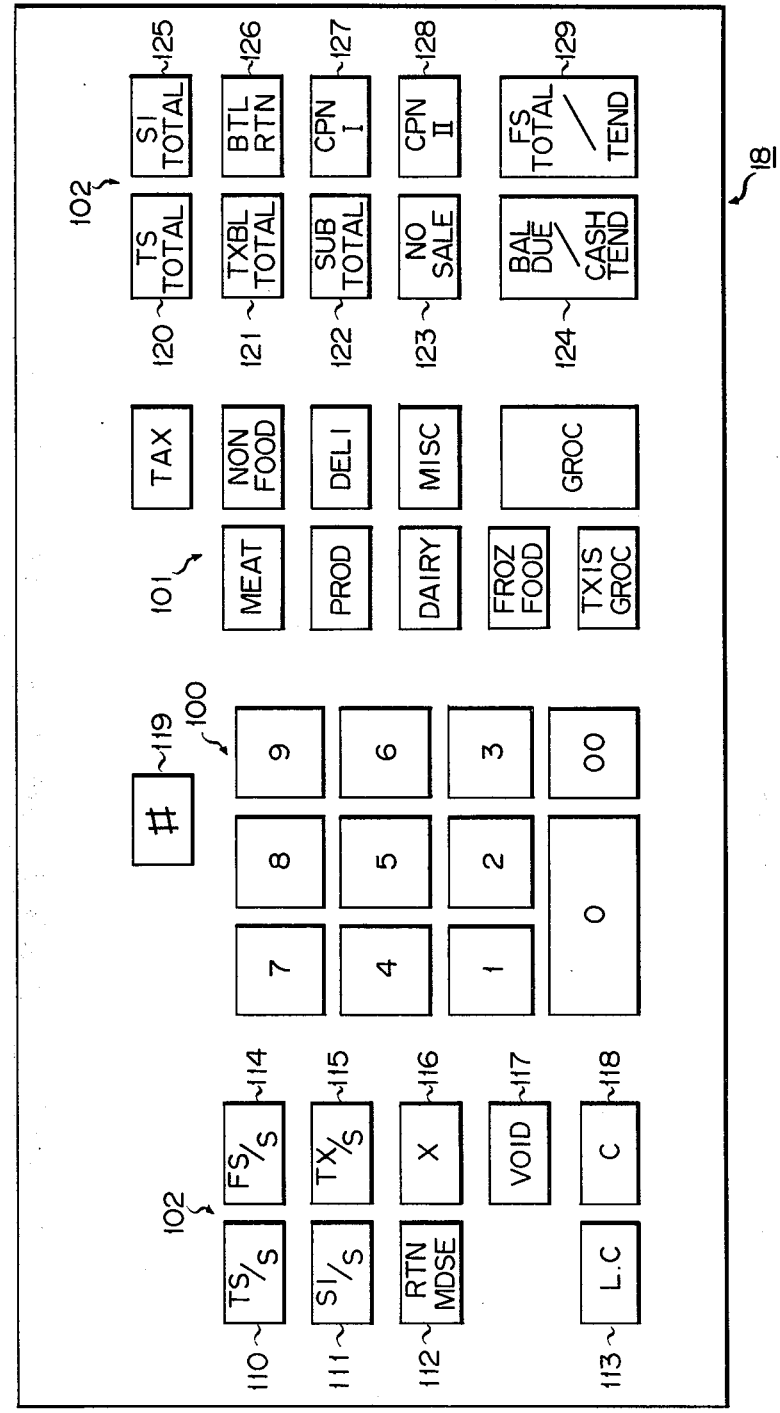
FIG. 2 is a plan view of the keyboard of the electronic cash register shown in FIG. 1.

As shown in detail in FIG. 2, the keyboard 18 has an entry key section 100, a department key section 101 and a transaction key section 102. As well known, the entry key section 100 includes 11 number keys by which sales are to be registered. The keys of the department key section 101 are selectively operated so that the sales may be registered according to the categories of goods, for example, "meat", "frozen food" and "daily necessaries". The transaction key section 102 has a trade stamp select key 110, a selective itemizer select key 111, a return merchandise key 112, a listing capacity extension key 113, a food stamp select key 114, a tax select key 115, a multiplication key 116, a void key 117, a clear key 118, a number key 119, a trade stamp total key 120, a taxable total key 121, a sub total key 122, a no sale key 123, a balance due/cash tendered key 124, a selective itemizer total key 125, a bottle return key 126, a coupon keys 127 and 128, and a food stamp total/tendered key 129.

The main switch 20 is operated to supply power to the cash register and cut the power supply. It further serves to set the operation mode of the electronic circuit of the register at "registration", "inspection" or "clear".

If the cash register is set at "registration" mode, the price of each item sold to a customer is stored in the memory of the electronic circuit. Thus, the total sales amount to the customer is computed. The computed total sales amount is printed on both a blank receipt and the journal paper. If "inspection" mode is selected, the total sales amount stored in the memory is printed out. At the same time, the total number of sold items, which is stored also in the memory, is printed out. When the cash register is set at the "clear" mode at the end of day's business, both the sales amount and number of sold items accumulated in the memory are printed out, and the contents of the memory are cleared.

Figure 3:
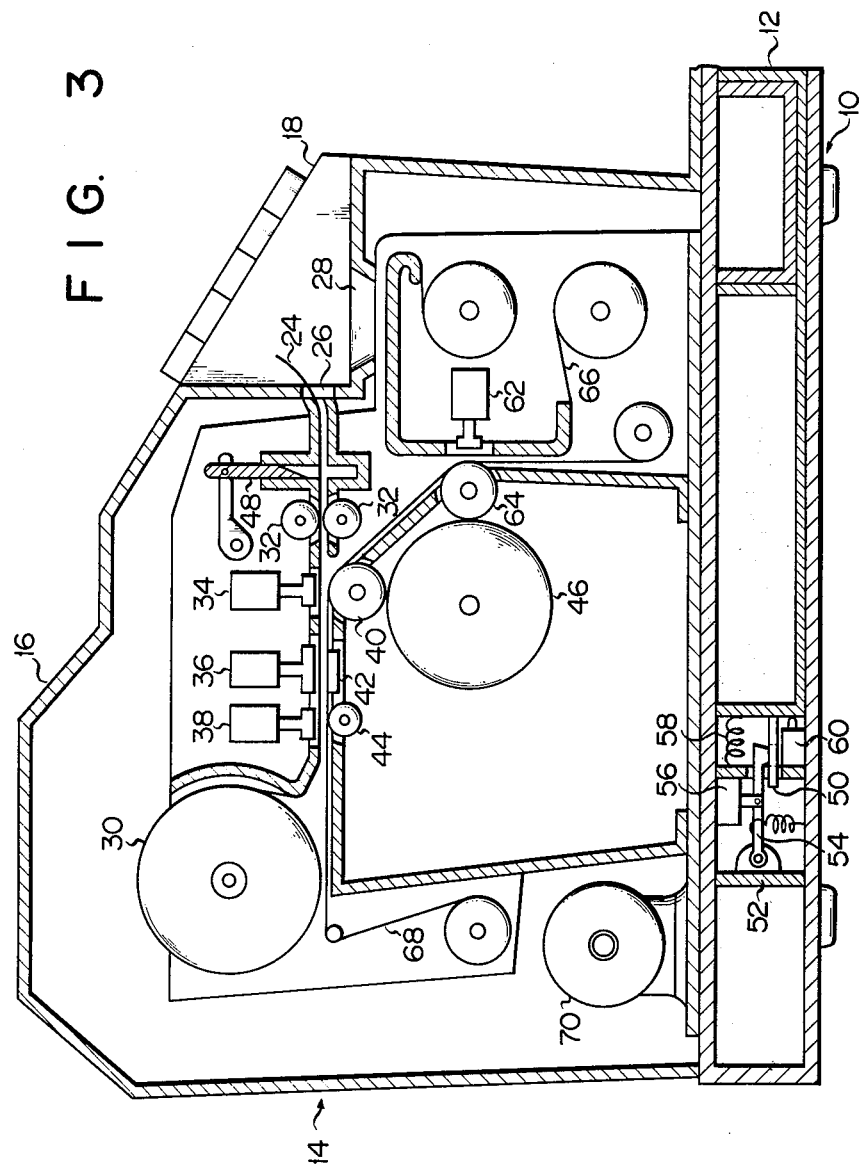
FIG. 3 is a cross-sectional side view of the electronic cash register shown in FIG. 1.

If cut vertically along a line passing the window 28, the cash register shown in FIG. 1 looks as illustrated in FIG. 3. The printed receipt 24 is fed out by a pair of receipt feed rollers 32. Behind the rollers 32 there are aligned three electro-magnetic print hammers 34, 36 and 38. Arranged respectively below the print hammers 34, 36 and 38 are type drum 40, a print table 42 and a type drum 44. The print hammers 34, 36 and 38, the type drums 40 and 44 and the print table 42 cooperate to print on the blank receipt 24 the sales amount, the mark of the store and the date of sale. The type drum 40 is kept in touch with a type selection roller 46. The roller 46 has its position controlled by an electronic control circuit (later described with reference to FIG. 4) in accordance with the key operation on the keyboard 18. The type drum 44 serves to print the date of sale, and the combination of types is manually made to set the date.

In front of the receipt feed rollers 32 a receipt cutter 48 is arranged. The cutter 48 is actuated by a signal from the electronic control circuit and cuts the printed receipt 24 already fed out through the receipt issue slot 26, when the drawer 12 is shut.

The rear wall of the drawer 12 has an eye plate 50. The box 10 has a partition wall 52, to which an arm 54 is pivotally attached. The arm 64 has a claw at its free end. Normally, the claw of the arm 64 is kept engaged with the hole of the eye plate 50, and the drawer 12 is therefore kept shut. When one of the keys on the keyboard 18, for instance the balance due/cash tendered key 124, is depressed, a solenoid type actuator 56 is urged by a signal from the electronic control circuit and releases the engagement between the eye plate 50 and the arm 54. As a result, a compression spring 58 between the partition wall 52 and the rear wall of the drawer 12 is allowed to expand, thereby to open the drawer 12. Provided also between the partition wall 52 and the rear wall is a microswitch 60, which is closed when the drawer 12 is shut. Upon detection of the closing of the microswitch 60, the electronic control circuit supplies a cutting instruction signal to the receipt cutter 48.

An electromagnetic print hammer 62 and a type drum 64 cooperate to print data on a journal paper 66. The type drum 64 is kept in touch with the type selection roller 46. Like the type drum 40, the type drum 64 has its position controlled by the type selection roller 46. Thus, the same transaction data are printed on both the blank receipt 42 and the journal paper 66.

Running between the print hammers 34, 38 and 62 and the type drums 40, 44 and 64 is an ink ribbon 68. A motor 70 is provided to drive the receipt feed rollers 32, the type selection roller 46, the receipt cutter 48, etc. Both the ink ribbon 68 and the motor 70 are of well known type, and either does not characterize this invention.

Figure 4:
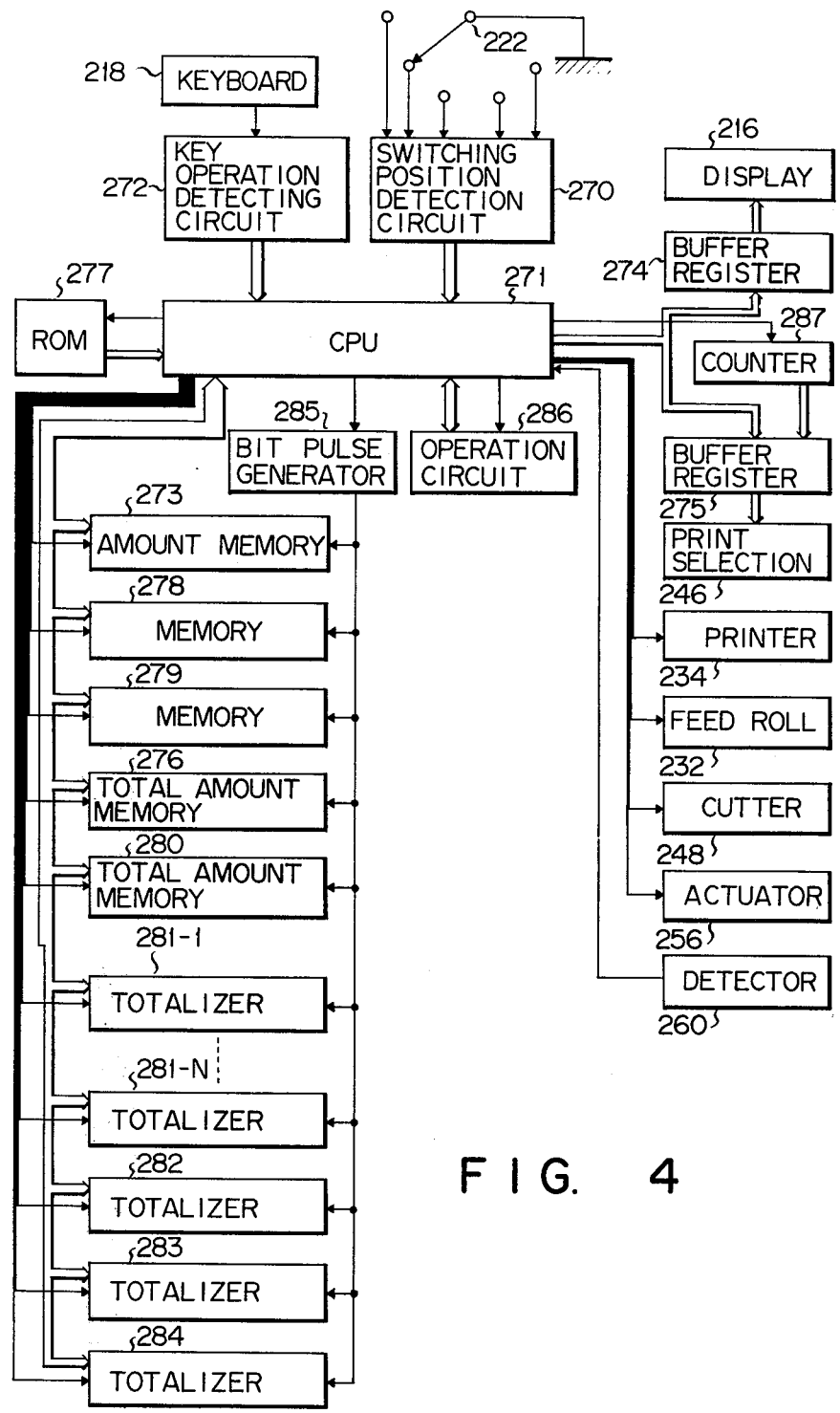
FIG. 4 shows the connection between the electronic circuit and mechanical parts of the electronic cash register shown in FIG. 1.

FIG. 4 shows the connection between the electronic control circuit and the mechanical devices such as a keyboard 218, a main switch 222 and a printer 234. Display 216, keyboard 218, main switch 222, print selection 246, cutter 248, actuator 256 and detector 260 shown in FIG. 4 correspond to the display device 16, keyboard 18, main switch 22, print selection roller 46, receipt cutter 48, solenoid type actuator 56 and microswitch 60, respectively. A printer 234 includes the print hammers 34, 36, 38 and 62, the type drums 40, 44 and 64 and the print table 42. A feed roller 232 includes not only the receipt feed rollers 32 but also the rollers (not shown) to feed the journal paper 66.

The position of the main switch 222 is detected by a switching position detection circuit 270. The detection circuit 270 sets a central processing unit (CPU) 271 at an operation mode which corresponds to the detected switching position of the main switch 222. The key operation on the keyboard 18 is detected by a key operation detecting circuit 272. Thus, the data defined by the detected key operation are supplied to the CPU 271.

Suppose the main switch 222 is so operated as to set the CPU 271 at, for example, "registration" mode, and a kay operation is made on the keyboard 18. Then, the CPU 271 normally reads out the amount of money defined by the key operation and stores the same into a memory 273. At the same time, the CPU 271 supplies to buffer registers 274 and 275 the data representative of the amount of money. The data stored in the buffer register 274 are then supplied to the display 216, and the amount is displayed. Meanwhile, the buffer register 275 puts the print selection circuit 246 into a state which corresponds to the data from the CPU 217. When a department key corresponding to the category of the sold good is operated thereafter, the CPU 271 supplies a department signal corresponding to the operated department key to the print selection circuit 246 through the buffer register 275. In this case, the CPU 271 simultaneously supplies a signal to the printer 234. In response to this signal the printer 234 prints the data stored in the buffer register 235 on both the receipt 24 and the journal paper 66. Upon completion of the printing, the CPU 271 supplies a signal to the feed roller 232, which feeds both the receipt 24 and the journal paper 66 by a predetermined distance.

Similar key operations are made to register sales amount of other goods. When the sub total key 122 (FIG. 2) is operated, the CPU 271 generates a signal. In response to this signal a total amount memory 276 stores the total amount of sales to the same customer. The total amount of sales is then supplied to the display 216 through the buffer register 274 and is displayed. The total sales amount is simultaneously supplied also to the print detection circuit 246 through the buffer register 275. Then, the sub total key 122 is operated for the second time to cause the CPU 271 to produce a print instruction signal. The print instruction signal is supplied to the printer 234, whereby the total sales amount is printed on both the receipt 24 and the journal paper 66. When the balance due key 124 (FIG. 2) is depressed thereafter, the CPU 271 supplies an instruction signal to the feed rollers 232. In response to the instruction signal, the feed rollers 232 feed out the receipt 24 through the predetermined distance. At the same time, the instruction signal is supplied also to the actuator 256, thereby to open the drawer 12.

After receiving cash from the customer and, if necessary, giving the change to the customer, the cashier shuts the drawer 12. Then, the detector 260 detects that the drawer 12 has been just shut, and supplies a detection signal to the CPU 271. In response to the detection signal, the CPU 271 supplies an instruction signal to the cutter 248. Upon receipt of the instruction signal, the cutter 248 cuts the printed receipt 24.

Figure 5:
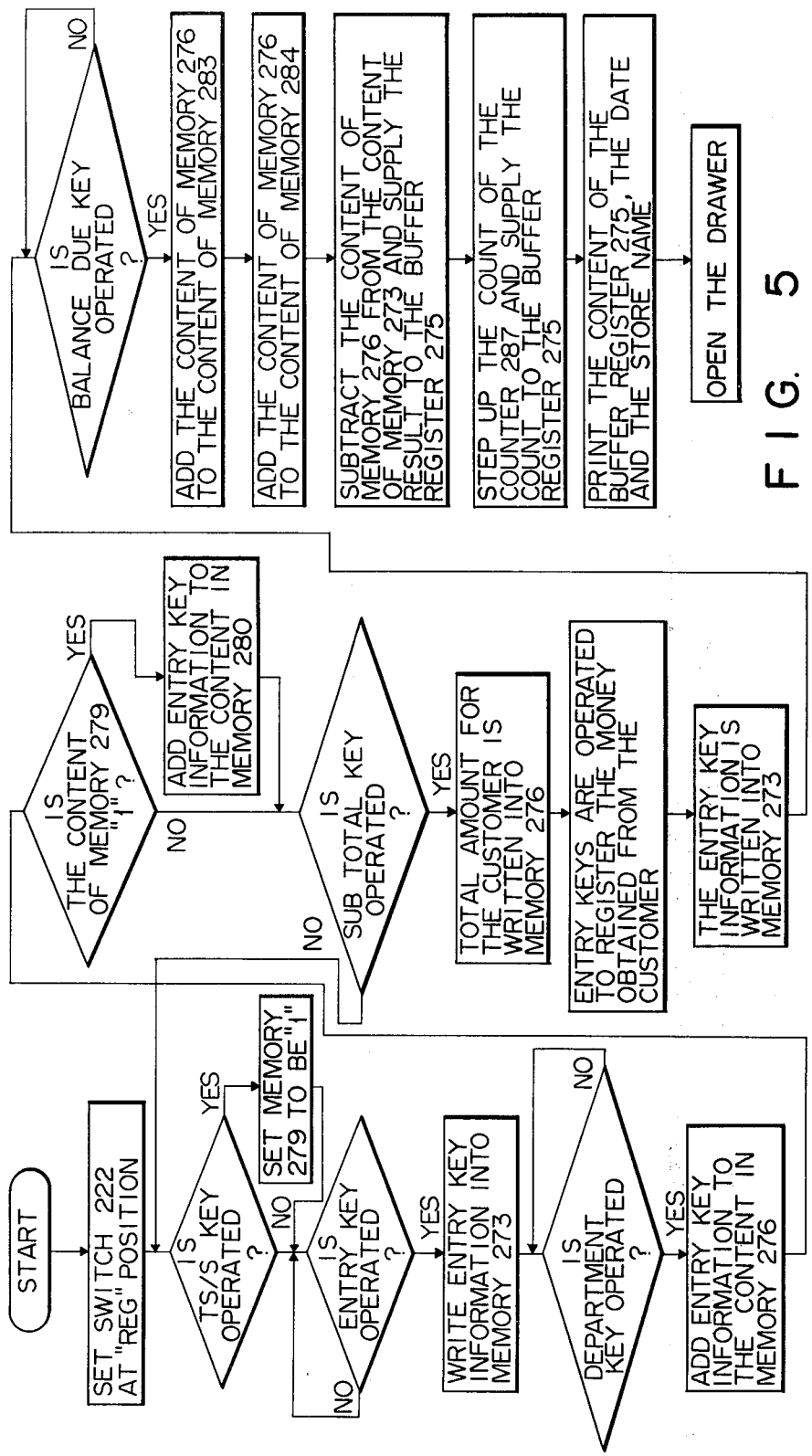
FIGS. 5 and 6 show the flow charts of the program to be incorporated into the read only memory (ROM) of the electronic circuit shown in FIG. 4.
Figure 6:
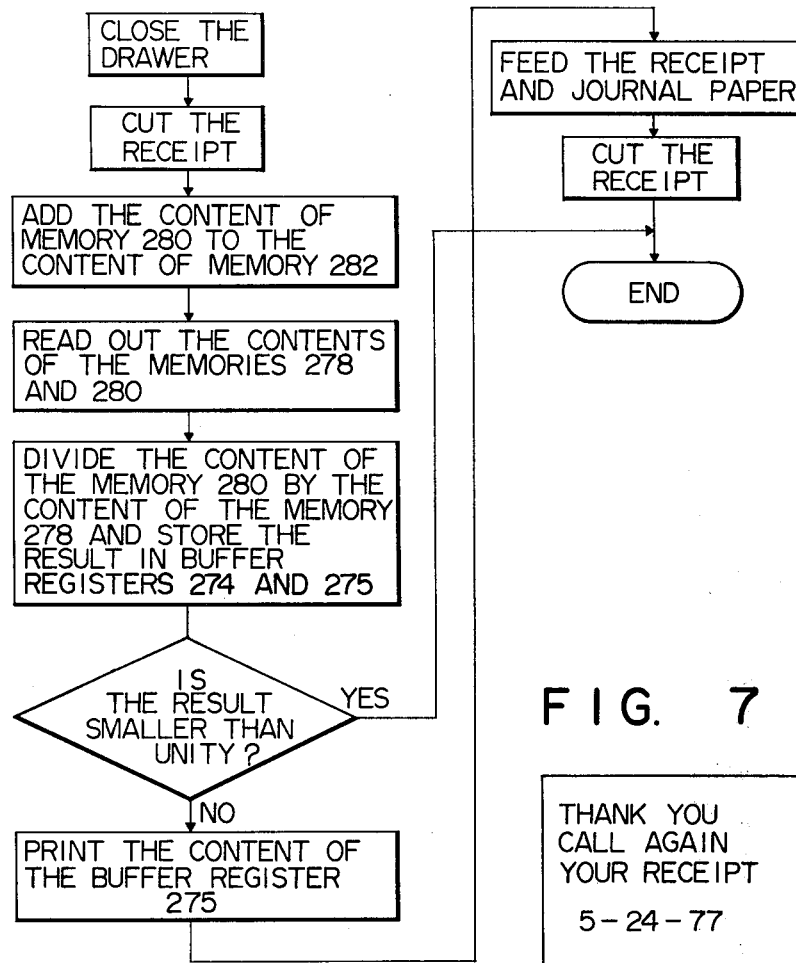

In FIG. 4, a read only memory 277 stores program information including such programs as shown in FIGS. 5 and 6, for example. It supplies to the CPU 271 the program information corresponding to an address signal which the CPU 271 has generated in accordance with key operation on the keyboard 218 and shift of switching position of the main switch 222.

A memory 278 stores a predetermined amount of money. If the sales amount of goods of a specific category to a customer is over the predetermined amount, the cashier gives the customer trade stamps or discount tickets the number of which corresponds to the sales amount, or he gives the customer a trade stamp or a discount ticket printed with the "point" which corresponds to the sales amount. On the other hand, a memory 279 stores the data which represent the specific category. It is therefore possible to determine whether or not any sold item of goods belongs to the specific category. Further provided is a total amount memory 280 which stores the total amount of sales of the goods of the specific category to each customer. Totalizers 281-1 to 281-N store the total sales amount for the day of the categories of goods (e.g. "meat", "frozen food", "daily necessaries" etc.), respectively. Another totalizer 282 stores the sales amount for the day of the goods of said specific category. Still another totalizer 283 stores the grand total cash sales amount for the day, while a totalizer 283 stores grand total sales for the day.

When data are read out from or written into the memories 273, 276 and 278 to 284 by the CPU 271, a bit pulse generator 285 supplies a timing signal to the memories in response to an output signal from the CPU 271. An operation circuit 286 calculates the point to be printed on a trade stamp or the number of trade stamp, which corresponds to the sales amount of the goods of the specific category.

A counter 287 is counted up when any department key is operated for the first time for the resistration operation. Its count is transferred to the buffer register 275, so that the same serial number is printed on the receipt 24 and the trade stamp or discount ticket.

With reference to the flow charts shown in FIGS. 5 and 6, it will now be explained how the cash registration is carried out by the cash register circuit shown in FIG. 4.

First, the main switch 222 is set at the "registration" position. The cashier sees if each sold item of goods calls for issuance of a trade stamp. If the sold item does so, he operates the trade stamp select key 110. Upon this key operation, the content of the memory 279 is set at "1". Thereafter the entry keys 100 are operated to register the price of the sold item. The data defined by the operation of the entry keys 100 are written into the memory 273 and simultaneously supplied to the buffer registers 274 and 275. The price of the item is therefore displayed by the display 216. This done, the cashier operates the department key 101 which corresponds to the category of the sold item. Then the contents of the memory 273 and the contents of the memory 276 are put together. The result of this addition is written into the memory 276. At the same time, the contents of both memories 273 and 276 are printed on both the blank receipt 24 and the journal paper 66, and the contents of the memory 273 are added to the contents of one of the totalizers 281-1 to 281-N which is associated with the operated department key 101. Thus, the contents of the totalizer are increased. If the content of the memory 279 is "1", the contents of the memory 273 are added also to the contents of the memory 280. The total contents of the memories 273 and 280 are written into the memory 280.

When all the sales amount to the customer is registered, the cashier operates the sub total key 122, thereby to write the total sales amount to the customer into the memory 276. Simultaneously, the total sales amount is printed on both the receipt 24 and the journal paper 66, and the memory 273 is cleared. This done, the cashier receives the cash from the customer and operates the entry keys 100 so as to write the received amount into the memory 273. He then operates the balance due key 124. As a result, the contents of the memory 276 (i.e. total sales amount to the customer) are added to both the contents of the totalizer 283 and the contents of the totalizer 284. Then, the contents of the memory 276 are automatically taken from the contents of the memory 273, thus calculating the change to be given to the customer.

The amount of the change thus calculated is displayed by the display 216 and stored into the buffer register 275. Then, the counter 287 is counted up by one digit in response to a signal from the CPU 271. The new count of the counter 287 is stored into the buffer register 275 and remains unchanged until the balance due key 124 is operated. In this way the print selection circuit 246 is made ready to print data. Thereafter the printer 234 is driven to print the contents of the buffer register 275, the date of sales and the store name. Upon completion of this printing, the feed rollers 232 are rotated in response to a signal from the CPU 271 and feed the receipt 24 for the predetermined distance. Simultaneously, the actuator 256 releases the drawer 12 also in response to the same signal from the CPU 271. Thus, the drawer 12 is opened automatically. Into the opened drawer 12 the cashier puts the received cash, and from the drawer 12 he takes out the changes.

Figure 7:
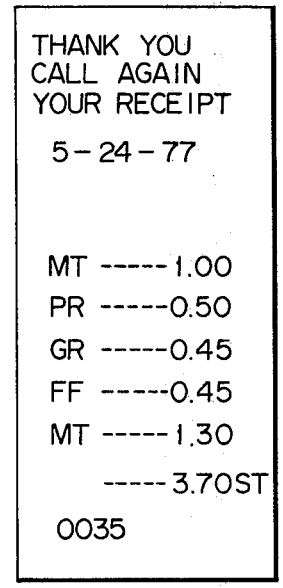
FIGS. 7 and 8 show a receipt and a trade stamp obtainable by the electronic cash register of FIGS. 1 to 4, respectively.

After giving the change to the customer, the cashier shuts the drawer 12. Upon detecting that the drawer 12 has been shut, the detector 260 generates a detection signal. In response to the detection signal the CPU 271 supplies an instruction signal to the cutter 248. Actuated by the instruction signal, the cutter 248 cuts the printed receipt 24. Consequently, there is issued at last such a printed receipt as shown in FIG. 7. At this moment, the contents of the memory 280 are added to the contents of the totalizer 282. Meanwhile, the contents Tu of the memory 278 are read out, and the contents Ts of the memory 280 are read out. Ts (i.e. the total sales amount of the goods of specific category to a customer) and Tu (i.e. the minimum sales required to issue one trade stamp or a one-point trade stamp) are both supplied to operation circuit 286. In the operation circuit 286 Ts is divided by Tu to obtain quotient Ts/Tu. Only the integral portion of the quotient is transferred to both buffer registers 274 and 275.

Figure 8:
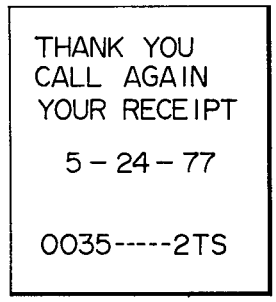

If Ts/Tu is smaller than 1, the CPU 271 generates a clear signal. The clear signal is supplied to the memories 273, 276, 279 and 280, thereby to clear them all. Thus does end the registration of the total sales to the customer. If Ts/Tu is equal to or greater than 1, the data corresponding to the contents of the buffer register 275 is printed on the receipt 24 and the journal paper 66. It should be noted that the count of the counter 287 remains unchanged and the same serial number printed on the issued receipt is printed on the receipt 24 and the journal paper 66. Thereafter, in response to an instruction signal from the CPU 271 the feed rollers 232 feed both the receipt 24 and the journal paper 66 through the predetermined distance. The cutter 248 is then actuated to cut the receipt 24. In this way there is issued such a trade stamp as shown in FIG. 8, which is printed with the point corresponding to Ts, i.e. the total sales of the goods of specific category to one customer. In case of the trade stamp of FIG. 8, Tu is set to be $1.00, and Ts is the total sales of the first four items of goods, e.g. $2.40. The point is therefore "2". The number "0035" on the left lower portion of the receipt and trade stamp in FIGS. 7 and 8 indicates the serial number.

Thus far this invention has been explained with reference to the preferred embodiment. But this does not means that this invention is limited to the embodiment. Various embodiments can be made by modifying the above-described one, within the technical scope of this invention. For example, an output signal of the detector 260 may be supplied as an instruction signal directly to the detector 260 when the drawer 12 is shut, while in the above-described embodiment an output signal of the detector 260 is supplied to the CPU 271 which supplies an instruction signal to the cutter 248.

What we claim is:
1. An electronic cash register comprising:
a keyboard having a plurality of entry keys, at least one department key and at least one transaction key;
data storing means including a first memory for storing sales amount data and a second memory for storing total sales amount for each transaction;
printing means for printing data on a recording paper;
a money drawer;
detection means for detecting the closure of said drawer to produce an output signal;

cutting means for cutting said recording paper;
an operation circuit; and
data processing means coupled to said keyboard and including means for supplying to said storing means data defined by the key operation on said keyboard, for supplying an instruction signal to said printing means to thereby print said data on said recording paper, for supplying an instruction signal to said cutting means in response to an output signal from said detection means to thereby cause said cutting means to cut the recording paper which is recorded with said data, for supplying an instruction signal to said operation circuit to thereby produce information drawn out from the sales amount data in said first memory and the total sales amount in said second memory, for supplying an instruction signal to said printing means to print said information from said operation circuit on said recording paper, and for supplying an instruction signal to said cutting means to cut said recording paper having said information recorded thereon.

2. An electronic cash register according to claim 1, wherein said at least one transaction key includes a first transaction key, said second memory includes a first memory section for accumulatively storing sales amount data defined by the key operation on said keyboard only when said first transaction key is operated, and said operation circuit produces information drawn out from the sales amount data in said first memory and in said first memory section of said second memory in response to the instruction signal from said data processing means.

3. An electronic cash register according to claim 1, wherein said first memory stores a referential sales amount data, and said operation circuit comprises a dividing circuit for dividing the total sales amount is said second memory by the referential sales amount data in said first memory to produce output data corresponding to the quotient obtained as the result of this division.

4. An electronic cash register according to claim 1, wherein said operation circuit comprises a substraction circuit for subtracting the total sales amount in said second memory from the sales amount data in said first memory to produce output data corresponding to the result of the subtraction.

5. An electronic cash register according to claim 1, which further comprises a counter connected to said printing means to supply numerical data to said printing means.

6. An electronic cash register according to claim 5, wherein said counter is counted up by a signal which is generated by said data processing means in response to the key operation of the first operated department key in a data registration operation.

7. An electronic cash register according to claim 5, wherein said counter is counted up by a signal which is generated by said data processing means in response to the key operation of a specified transaction key in a data registration operation.

* * * * *